United States Patent [19]

Nobutoki et al.

[11] Patent Number: 5,408,471
[45] Date of Patent: Apr. 18, 1995

[54] MULTIPLEX TRANSMISSION APPARATUS

[75] Inventors: Yoshikazu Nobutoki; Toshiyuki Matsuzaki; Koji Terayama; Hideki Nakazono, all of Hiroshima, Japan

[73] Assignee: Mazda Motor Corporation, Hiroshima, Japan

[21] Appl. No.: 159,492

[22] Filed: Nov. 30, 1993

[30] Foreign Application Priority Data

Nov. 30, 1992 [JP] Japan .................. 4-320539

[51] Int. Cl.⁶ ............................................. H04J 3/02
[52] U.S. Cl. ................................ 370/85.9; 370/85.1
[58] Field of Search ................ 370/85.1, 16, 13, 14, 370/85.7, 85.9, 91, 92, 93, 94.1, 94.2; 340/825.5

[56] References Cited

U.S. PATENT DOCUMENTS

| Re. 28,958 | 9/1976 | Zafiropulo et al. | 370/85.9 |
| 4,535,448 | 8/1985 | Baxter et al. | 370/85.9 |
| 5,090,012 | 2/1992 | Kajiyama et al. | 370/110.1 |
| 5,161,186 | 11/1992 | Dolev et al. | 370/16 |

FOREIGN PATENT DOCUMENTS 2-16845A 1/1990 Japan.

Primary Examiner—Douglas W. Olms
Assistant Examiner—Huy D. Vu

[57] ABSTRACT

Communication nodes which respectively transmit periodic information and non-periodic information in multiplex fashion are provided separately. These communication nodes selectively transmit periodic information to a multiplex transmission line which is originally for transmitting the non-periodic information or non-periodic information to a multiplex transmission line which is originally for transmitting the periodic information in accordance with the state of transmission/reception of the periodic information and non-periodic information.

7 Claims, 13 Drawing Sheets

MULTIPLEX TRANSMISSION APPARATUS

BACKGROUND OF THE INVENTION

1. Field of the Invention

The present invention relates to a multiplex transmission apparatus which comprises a plurality of nodes connected to communication lines for transmission and reception of various kinds of control information in a multiplexed fashion, to/from the communication lines.

2. Description of Related Art

Recent increase of electrical components for vehicles and control systems and development of electronic control to such components and control systems have brought an enormous increase in the number of wiring, connectors and electronic control devices arranged in a vehicle body, making a wire harness attached to the vehicle body larger in size and heavier in weight. The growth of the wire harness limits attaching space in the vehicle body and degraded flexibility of wire harness lowers attaching efficiency. Further, an increase of the weight of wire harness is directly related to increase of weight of the vehicle body.

For the purpose of decreasing the number of wiring, connectors and electronic control devices, it is proposed to construct a multiplex communication system for vehicle which comprises a common communication line for multiplex transmission of plural kinds of control information to operate various electrical components and control systems in a vehicle. The common communication line is connected to a plurality of nodes which perform transmission and reception of control information to/from the line, and various electrical components and control systems are appropriately connected to the nodes.

In this multiplex communication system for a vehicle, the communication line for transmission of multiplexed control information is formed by a signal transmission path comprised of a wire harness arranged in a vehicle body. The plurality of nodes connected to the communication line are respectively combined with signal generating devices such as sensors and switches, and an operation unit such as various actuators and motors arranged in the vehicle. Each node generates control information based on a signal from the connected various signal generating devices and transmits the control information to the communication lines. Furthermore, each node receives selected control information from the communication line and generates an operation control signal based on the received control information. The node supplies the operation control signal to the operation unit to perform an operation control. The multiplexed control information transmitted through the communication line is expressed by, e.g., a pulse code modulation (PCM) signal in a form of non-return-to-zero (NRZ) modulated carrier wave signal.

In the above-mentioned multiplex communication system, upon generating control information based on a signal from a signal generating device in the connected node, or generating an operation control signal based on control information received from the communication line, in accordance with the signal from the signal generating device or the control information received from the communication line, the signal generating device or the operation unit usually requires an operation processing by an operation control unit comprising, e.g., a microcomputer. Each node connected to the signal generating device or the operation unit includes a transceiver connected to the communication line, an operation control unit connected to the transceiver, comprising, e.g., a microcomputer, and an input-output processor connected to the operation control unit and either the signal generating device or the operation unit.

As described above, in the multiplex communication system comprised of a plurality of nodes which transmit and receive control information to/from the communication line in a multiplexed fashion, the control information can be categorized into two types: periodic control information which is generated at regular intervals; and non-periodic control information which is generated at irregular intervals.

In the conventional multiplex communication system, periodic control information and non-periodic control information are multiplexed through the same communication line. In this case, if non-periodic control information is suddenly supplied to the same communication line where periodic control information is sequentially transmitted, the transmission state of the periodic control information is effected by an intrusion of the non-periodic control information, and the interval of the periodic control information may be undesirably changed.

More particularly, as shown in FIG. 13, when signals from nodes A and B exist in the same communication line at the timing $t_1$, the node B delays its transmission of signal until the node A finishes transmitting a signal (timing $t_2$). As shown in FIG. 14, when the nodes A and B transmit signals simultaneously, a signal having higher priority (the signal from the node A has higher priority in this embodiment) is transmitted.

When the above-mentioned undesirable change occurs, in the node where an operation control signal based on the received periodic control information is generated, and the operation control signal is supplied to the connected operation unit so as to perform an operation control of the operation unit, there may be a case where the operation control signal is not properly supplied to the operation unit.

SUMMARY OF THE INVENTION

Accordingly, it is an object of the present invention to provide a multiplex transmission apparatus capable of avoiding an undesirable change in the interval of generating periodic information caused when the periodic information is effected from non-periodic control information transmitted through the same communication line.

According to the present invention, the foregoing object can be attained by providing a multiplex transmission apparatus having a plurality of multiplex transmission paths and a plurality of communication nodes connected to the plurality of multiplex transmission paths, comprising: a first multiplex transmission path for performing multiplex transmission on predetermined periodic control information; a second multiplex transmission path for performing multiplex transmission on predetermined non-periodic control information; first transmission/reception means for transmitting/receiving the periodic control information to/from the first multiplex transmission path; second transmission/reception means for transmitting/receiving the non-periodic control information to/from the second multiplex transmission path; first determination means for determining whether or not transmission/reception of the periodic control information in the first transmission/reception means is properly executed; second determination means for determining whether or not transmission/reception of the non-periodic control information in the second transmission/reception means is properly executed; first changing means for changing an object transmission path for the periodic control information from the first multiplex transmission path to the second multiplex transmission path in a case where it is determined that the transmission/reception of the periodic control information is not properly executed; and second changing means for changing an object transmission path for the non-periodic control information from the second multiplex transmission path to the first multiplex transmission path in a case where it is determined that the transmission/reception of the non-periodic control information is not properly executed.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings.

Figure 1:
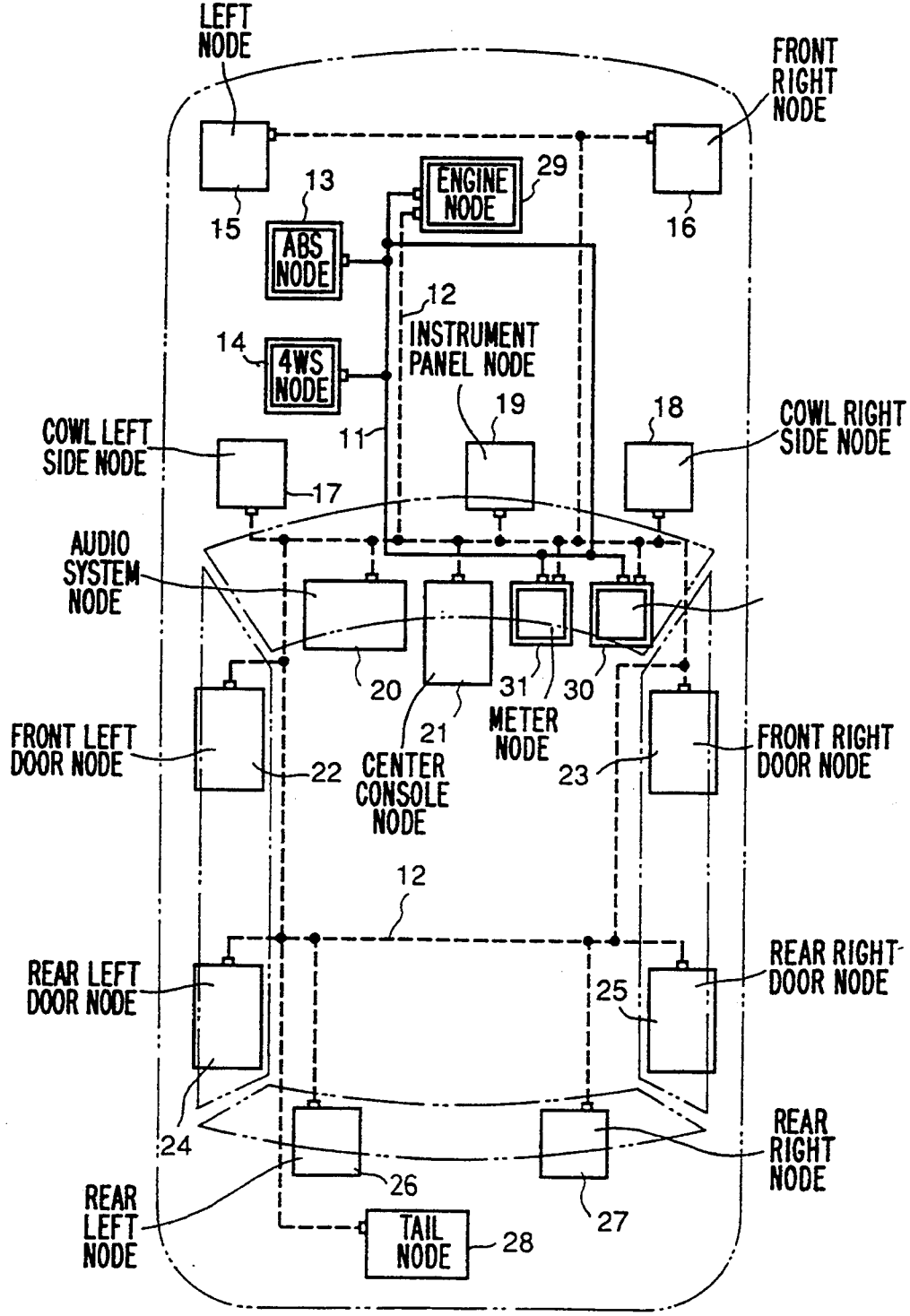
FIG. 1 is a block diagram showing the configuration of a multiplex transmission apparatus according to a preferred embodiment of the present invention which is applied to a vehicle.

FIG. 1 shows the configuration of a multiplex transmission apparatus according to an embodiment of the present invention which is applied to a vehicle.

In FIG. 1, two types of multiplex transmission line systems comprising communication lines represented by a full line and a broken line are formed in a vehicle body represented by an alternate long and short dash line. The communication line represented by the full line is a periodic information communication line 11 on which various periodic control information generated at regular intervals is transmitted in a multiplexed fashion. The other communication line represented by the broken line is a non-periodic information communication line 12 on which various non-periodic control information generated at irregular intervals is transmitted in a multiplexed fashion. The periodic information communication line 11 and the non-periodic information communication line 12 are arranged inside of the vehicle body, and a plurality of nodes arranged at respective parts of the vehicle body are connected to the communication lines.

The nodes include an anti-skid brake system (ABS) node 13 and a four-wheel steering (4WS) node 14 connected to the periodic information communication line 11, a front left node 15, a front right node 16, a cowl left-side node 17, a cowl right-side node 18, an instrument panel node 19, an audio system node 20, a center console node 21, a front left door node 22, a front right door node 23, a rear left door node 24, a rear right door node 25, a rear left node 26, a rear right node 27 and a tail node 28 connected to the non-periodic information communication line 12, and an engine node 29, a column node 30 and a meter node 31 connected to both the periodic information communication line 11 and the non-periodic information communication line 12.

Each of the nodes is connected to an operation unit such as various actuators and motors, and a signal generating device such as various sensors and switches (not shown in FIG. 1).

Description of the Entire Node

Among the above-mentioned plurality of nodes, each node connected to the periodic information communication line 11 generates periodic control information at regular intervals based on a signal from the signal generating device connected to the node, and then transmits the control information to the periodic information communication line 11. The node also receives selected periodic control information from the periodic information communication line 11, generates a control signal based on the received periodic control information, and supplies the control signal to the operation unit to perform an operation control.

Similarly, each node among the plurality of the nodes connected to the non-periodic information communication line 12 generates control information at non-periodic intervals based on a signal from a signal generating device and transmits the control information to the non-periodic information communication line 12 as transmission control information. This node also receives selected non-periodic control information from the non-periodic information communication line 12, generates a control signal based on the received control information, and supplies the signal to the operation unit to perform operation control.

Furthermore, the engine node 29, column node 30 and meter node 31 connected to both the periodic information communication line 11 and the non-periodic information communication line 12 respectively perform transmission/reception of periodic control information to/from the periodic information communication line 11, and transmission/reception of non-periodic control information to/from the non-periodic information communication line 12.

The Configuration of the Non-Operation Control Type Node

Among the above-mentioned plurality of nodes, in the audio system node 20, the center console node 21, the front left door node 22, the front right door node 23, the rear left door node 24, the rear right door node 25 and the tail node 28, upon forming non-periodic control information based on a signal generated in the signal generating device connected to each node, an operation processing is not performed by a control unit comprised of, e.g., a microcomputer. In these nodes, upon generating a control signal which operates the operation unit connected to each node based on the non-periodic control information received from the non-periodic information communication line 12, the control unit does not perform the operation processing.

Figure 2:
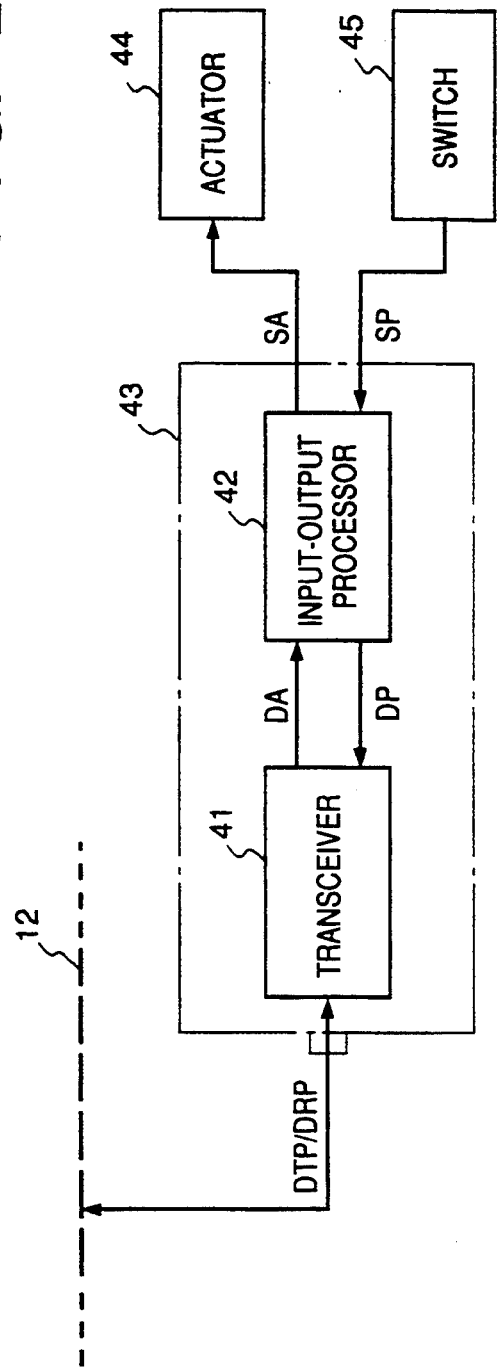
FIG. 2 is a block diagram showing the configuration of a non-operation control type node according to the preferred embodiment.

Accordingly, the audio system node 20, the center console node 21, the frontleft door node 22, the front right door node 23, the rear left door node 24, the rear right door node 25 and the tail node 28 form a non-operation control type node 43 as shown in FIG. 2. The node 43 includes a transceiver 41 connected to the non-periodic information communication line 12 and an input-output processor 42 connected to the transceiver 41. The input-output processor 42 is connected to an actuator 44 which forms an operation unit, and to a switch 45 which forms a signal generating device.

The Configuration of the Operation Control Type Node

In contrast, among the plurality of nodes, in the ABS node 13, the 4WS node 14, the front left node 15, the front right node 16, the cowl left-side node 17, the cowl right-side node 18, the instrument panel node 19, the rear left node 26, the rear right node 27, the engine node 29, the column node 30 and the meter node 31, upon forming periodic control information or non-periodic control information based on a control signal generated in the signal generating device, an operation processing is performed by a control unit comprising, e.g., a microcomputer. In these nodes, upon generating a control signal which operates the operation unit connected to each node based on periodic control information or non-periodic control information received from the periodic communication line 11 or non-periodic communication line 12, the control unit does not perform the operation processing.

Figure 3:
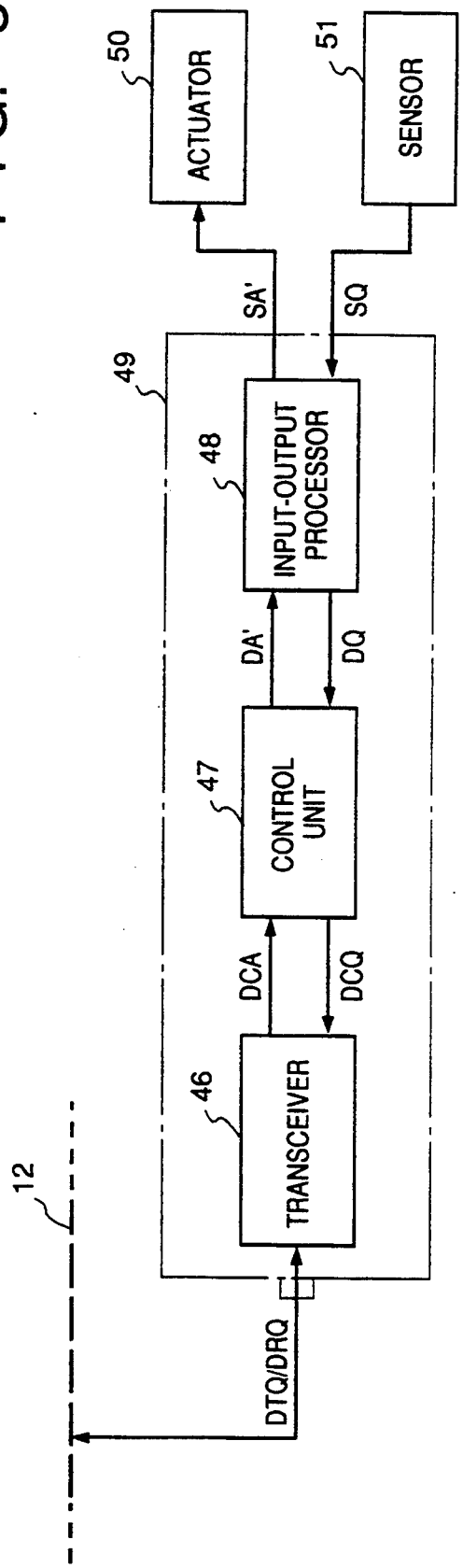
FIG. 3 is a block diagram showing the configuration of an operation control type node according to the preferred embodiment.

Among the nodes where the operation processing is performed, upon forming periodic control information or non-periodic control information, and forming a control signal based on the periodic control information or the non-periodic control information, as shown in FIG. 3, the front-left node 15, front-right node 16, cowl left-side node 17, cowl right-side node 18, instrument panel node 19, rear left-node 26 and rear right node 27 which are connected to the non-periodic information communication line 12 respectively form an operation control type node 49 including a transceiver 46 connected to the non-periodic information communication line 12, a control unit 47 (comprised of a microcomputer) connected to the transceiver 46 and an input-output processor 48 connected to the control unit 47. The input-output processor 48 is also connected to an actuator 50 forming an operation unit, and to a sensor 51 forming a signal generation unit.

Figure 4:
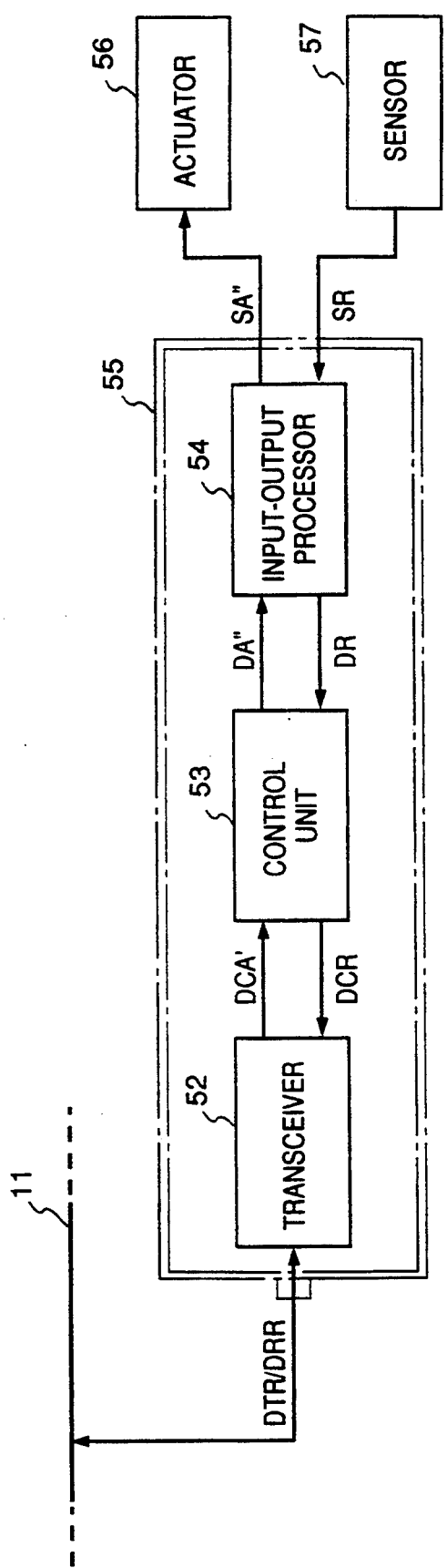
FIG. 4 is a block diagram showing the configuration of an operation control type node according to the preferred embodiment.

Among the nodes where the operation processing is performed, upon forming periodic control information or non-periodic control information, and forming a control signal based on the periodic control information or the non-periodic control information, as shown in FIG. 4, the ABS node 13, 4WS node 14, engine node 29, column node 30 and meter node 31 which are connected to the periodic information communication line 11 respectively form an operation control type node 55 including a transceiver 52 connected to the periodic information communication line 11, a control unit 53 (comprised of a microcomputer) connected to the transceiver 52 and an input-output processor 54 connected to the control unit 53. The input-output processor 54 is also connected to an actuator 56 forming an operation unit, and to a sensor 57 forming a signal generation unit.

Furthermore, among the nodes where the operation processing is performed, upon forming periodic control information or non-periodic control information and forming a control signal based on the periodic control information or the non-periodic control information, the engine node 29 connected to both the periodic information communication line 11 and the non-periodic information communication line 12 includes the operation control type node 49 shown in FIG. 3 and the operation control type node 55 shown in FIG. 4.

Configuration of the Column Node

Figure 5:
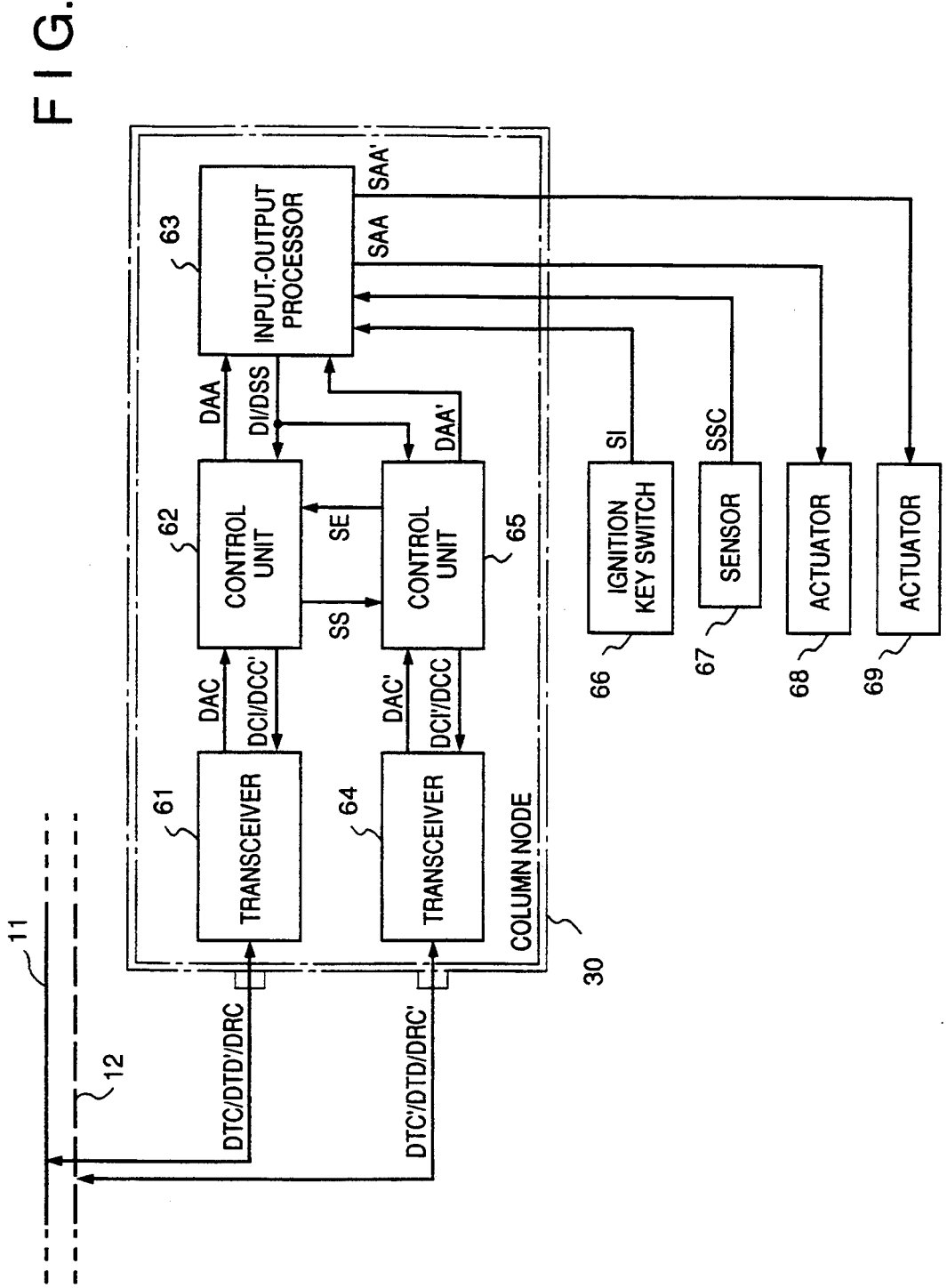
FIG. 5 is a diagram showing the configuration of a column node according to the preferred embodiment.

Among the nodes where the operation processing is performed, upon forming periodic control information or non-periodic control information and forming a control signal based on the periodic control information or the non-periodic control information, as shown in FIG. 5, the column node 30 which is connected to both the periodic information communication line 11 and non-periodic information communication line 12 includes a transceiver 61 connected to the periodic information communication line 11, a control unit 62 (comprised of a microcomputer) connected to the transceiver 61, an input-output processor 63 connected to the control unit 62, a transceiver 64 connected to the non-periodic information communication line 12 and a control unit 65 (comprised of a microcomputer) connected to the transceiver 64. The input-output processor 65 is also connected to the control unit 62 and the input-output processor 63. The input-output processor 63 is connected to an ignition key switch 66 and a sensor 67 forming a signal generating device, and to actuators 68 and 69 forming an operation unit.

Configuration of the Meter Node

Figure 6:
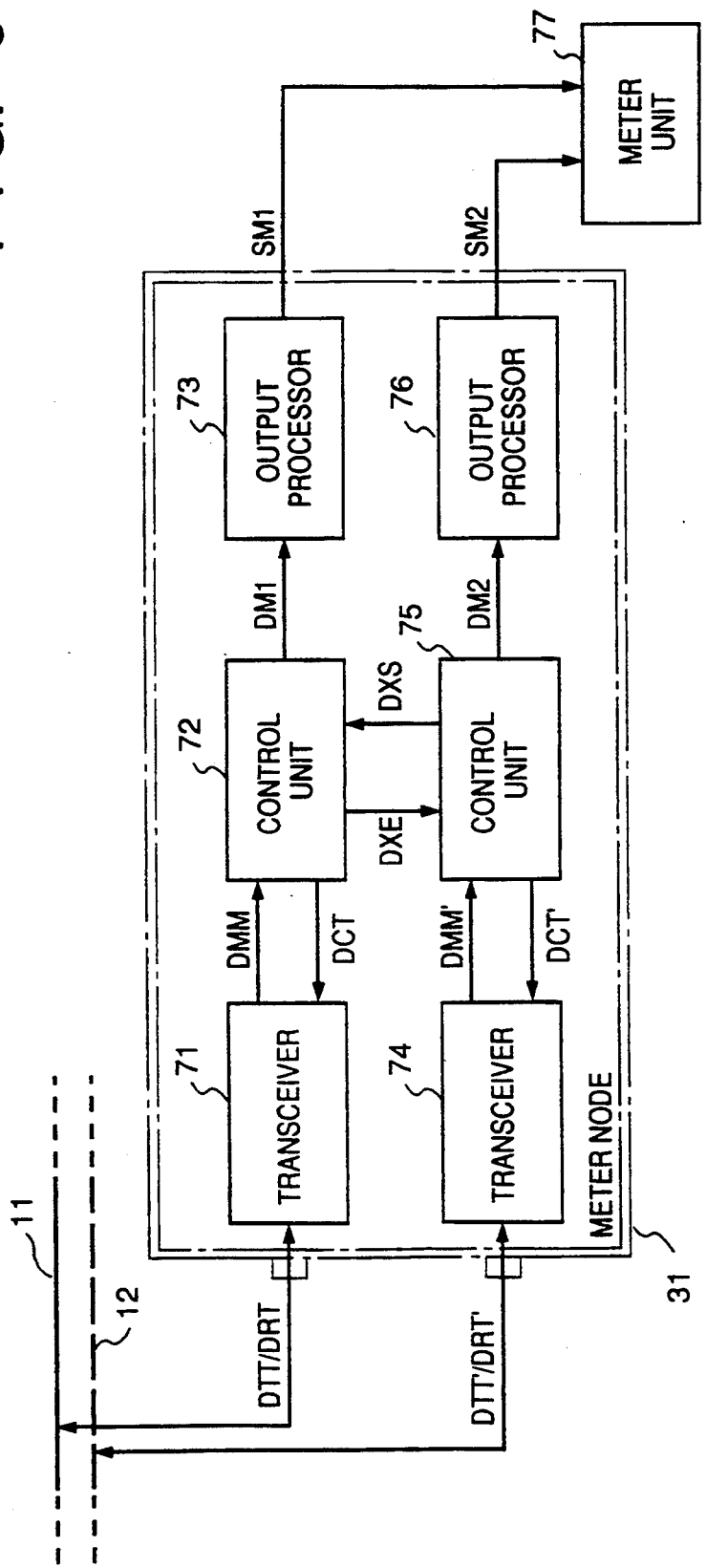
FIG. 6 is a diagram showing the configuration of a meter node according to the preferred embodiment.

Furthermore, upon forming periodic control information or non-periodic control information and forming a control signal based on the periodic control information or the non-periodic control information, as shown in FIG. 6, the meter node 31 connected to both the periodic information communication line 11 and non-periodic information communication line 12 includes a transceiver 71 connected to the periodic information communication line 11, a control unit 72 (comprised of a microcomputer) connected to the transceiver 71, an output processor 73 connected to the control unit 72, a transceiver 74 connected to the non-periodic information communication line 12, a control unit 75 (comprised of a microcomputer) connected to the transceiver 74 and an output processor 76 connected to the control unit 75. The control units 72 and 75 are connected to each other and the output processors 73 and 76 are respectively connected to a meter unit 77.

Figure 7:
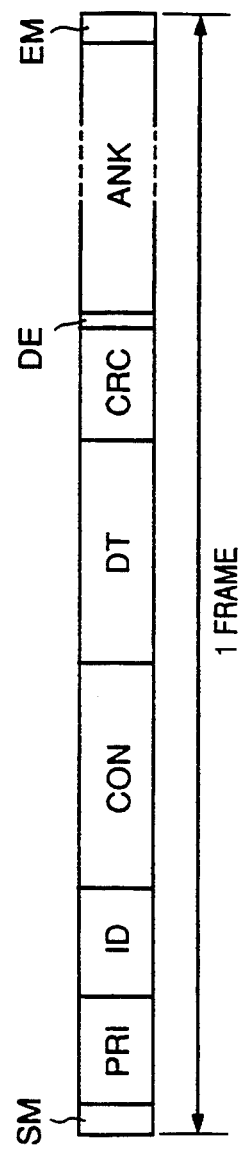
FIG. 7 is a block diagram showing the frame structure of each control information in the preferred embodiment.

The periodic control information and non-periodic control information which are respectively multiplexed through the periodic information communication line 11 and the non-periodic information communication line 12 are transmitted in frame units. FIG. 7 illustrates the structure of a frame unit of the control information. In FIG. 7, a frame is comprised of code data having a predetermined number of bits including a start marker SM, data PRI indicating priorities, data ID indicating information type, data CON indicating validity of the information, data DT indicating the content of the information, error correction data CRC, data end flag DE, data ANK indicating confirmation of receiving information and an end marker EM.

The Operation of the Non-Operation Control Type Node

In the non-operation control type node 43 as shown in FIG. 2, the transceiver 41 receives non-periodic control information DRP having the frame structure as shown in FIG. 7 from the non-periodic information communication line 12, and performs demodulation and decoding on the non-periodic control information DRP to obtain reproduction information DA. The obtained reproduction information DA is then supplied to the input-output processor 42.

The input-output processor 42 performs digital-analog (D/A) conversion on the reproduction information DA to generate a control signal SA and supplies the control signal SA to the actuator 44 via an amplifier (not shown). Thus the actuator 44 is controlled by the control signal SA.

In the non-operation control type node 43, a signal SP is supplied to the input-output processor 42 when the switch 45 is operated. After the signal SP is amplified, the input-output processor 42 performs analog-digital (A/D) conversion on the signal SP to generate transmission information DP and supplies the transmission information DP to the transceiver 41. The transceiver 41 performs coding and modulation on the transmission information DP to obtain non-periodic control information DTP having the frame structure as shown in FIG. 7, and then transmits the non-periodic control information DTP to the non-periodic information communication line 12.

The Operation of the Operation Control Type Node 49

In the operation control type node 49 as shown in FIG. 3, the transceiver 46 receives non-periodic control information DRQ having the frame structure as shown in FIG. 7 from the non-periodic information communication line 12. The transceiver 46 performs demodulation and decoding on the non-periodic control information DRQ to obtain reproduction information DCA. The obtained reproduction information DCA is then supplied to the control unit 47. The control unit 47 performs the operation processing based on the reproduction information DCA and other information to obtain information DA', and then the obtained information DA' is supplied to the input-output processor 48.

The input-output processor 48 performs D/A conversion on the information DA' to generate a control signal SA' and outputs the control signal SA' via an amplifier (not shown) to the actuator 50. Thus the actuator 50 is controlled by the control signal SA'.

Furthermore, in the operation control type node 49, a detected signal SQ from a sensor 51 is supplied to the input-output processor 48. After the signal SQ is amplified, the input-output processor 48 performs A/D conversion on the detected signal SQ to generate detected information DQ, and the detected information DQ is supplied to the control unit 47.

The control unit 47 performs an operation processing based on the detected information DQ and other information to obtain operation processing output information DCQ, and supplies the obtained information DCQ to the transceiver 46. The transceiver 46 performs coding and modulation on the information DCQ to obtain non-periodic control information DTQ having the frame structure as shown in FIG. 7, and transmits it to the non-periodic information communication line 12.

The Operation of Operation Control Type Node 55

In the operation control type node 55 as shown in FIG. 4, the transceiver 52 receives periodic control information DRR having the frame structure as shown in FIG. 7 from the periodic information communication line 11. The transceiver 52 performs demodulation and decoding on the periodic control information DRR to obtain reproduction information DCA' which is supplied to the control unit 53. In the control unit 53, the operation processing is performed based on the reproduction information DCA' and other information to obtain operation processing information DA''. The obtained information DA'' is then supplied to the input-output processor 54.

In the input-output processor 54, D/A conversion is performed on the operation process information DA'' to form a control signal SA''. The control signal SA'' is supplied to the actuator 56 from the output processor 54 via an amplification circuit (not shown). Thus the operation control of the actuator 56 is performed by the control signal SA''.

In the operation control type node 55, a detected signal SR is supplied from a sensor 57 to the input-output processor 54. In the input-output processor 54, after the detected signal SR is amplified, A/D conversion is performed on the signal SR, and detection output information DR is formed and supplied to the control unit 53.

In the control unit 53, the operation processing is performed based on the detected information DR and other information, and then operation processing output information DCR is obtained and supplied to the transceiver 52. In the transceiver 52, coding or modulation are performed on the information DCR to obtain periodic control information DTR. The obtained information DTR having the frame structure as shown in FIG. 7 is then transmitted to the periodic information communication line 11.

The Operation of the Column Node 30

Figure 8:
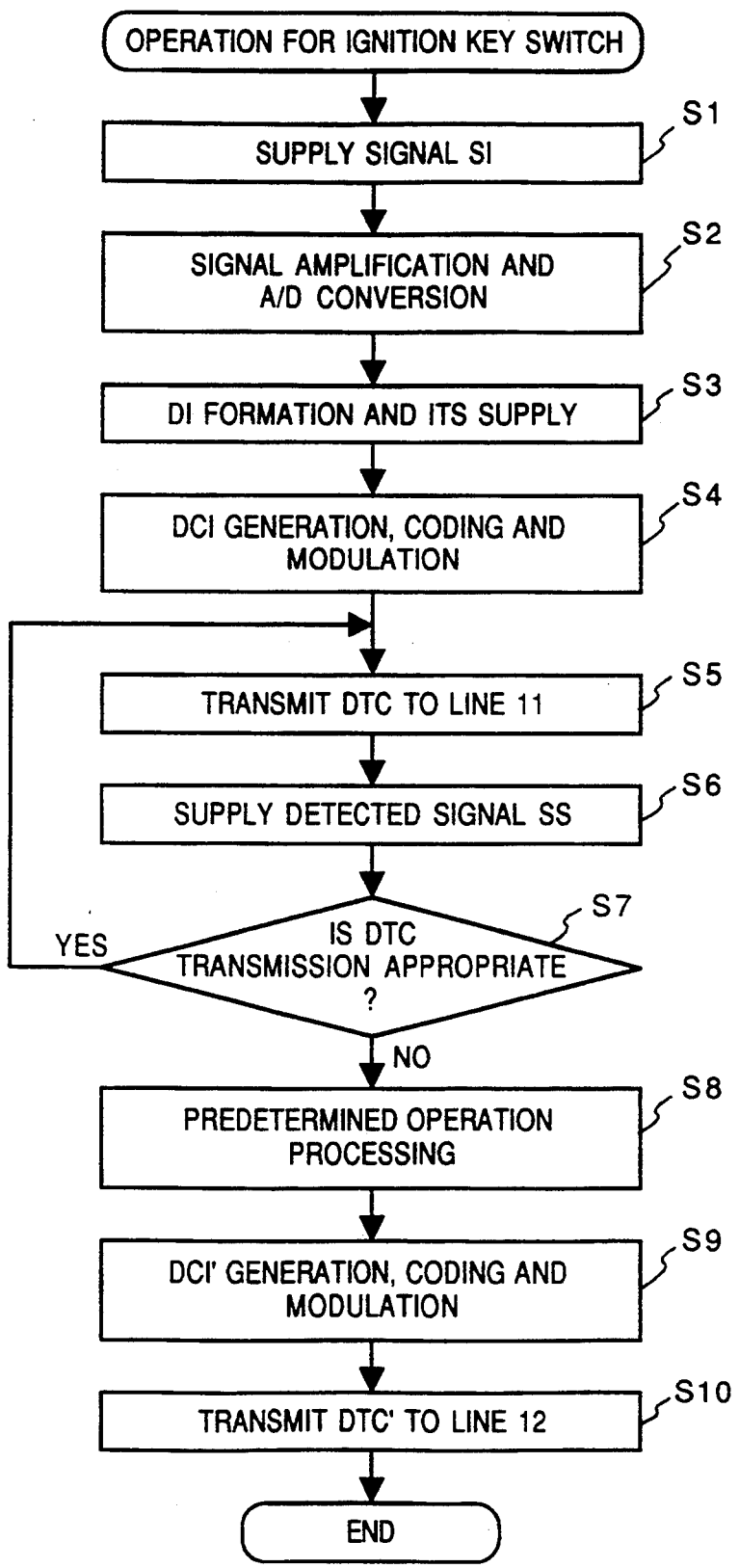
FIGS. 8 and 9 are flowcharts illustrating the operation of the column node according to the preferred embodiment.
Figure 9:
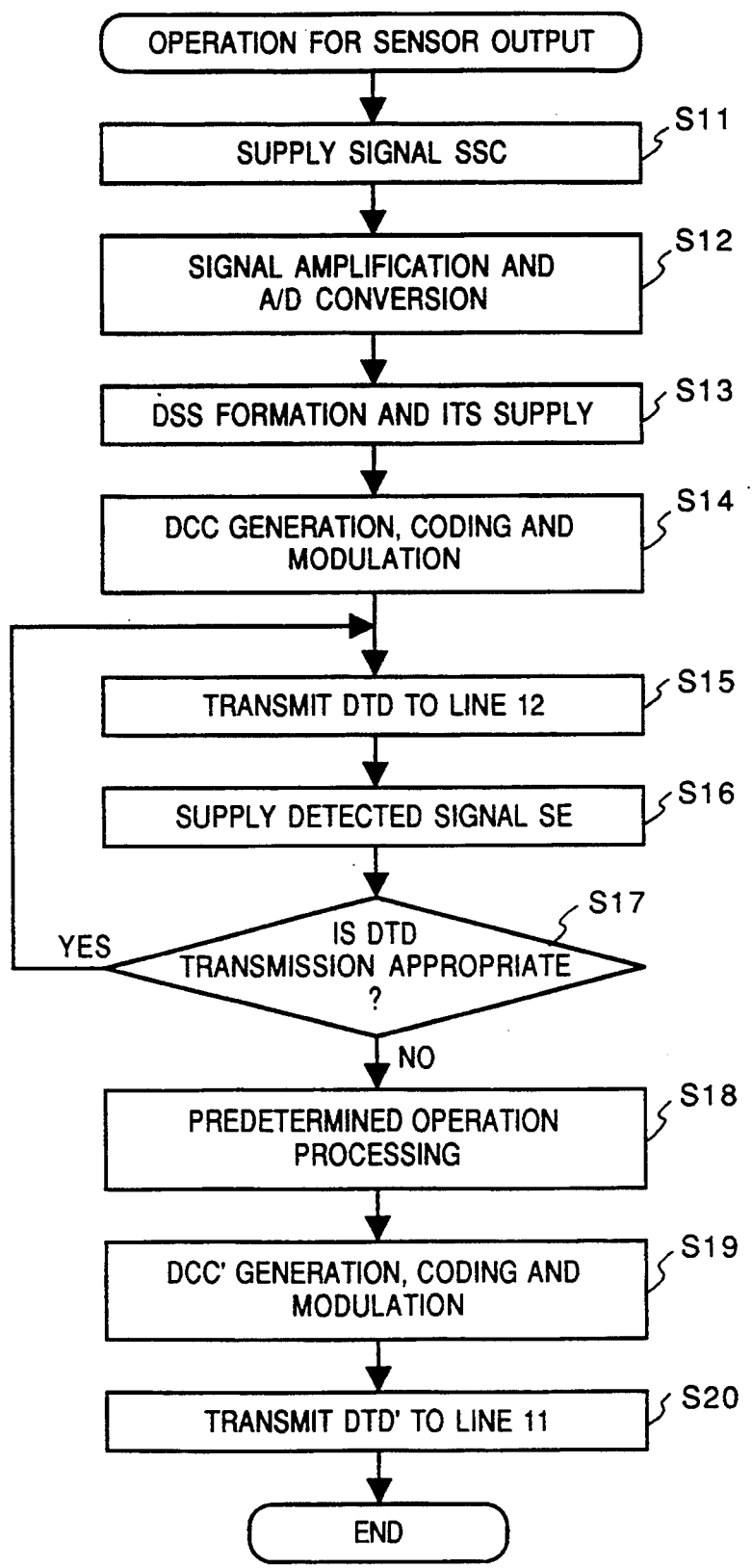

The operation of the column node 30 is described with reference to the flowcharts shown in FIGS. 8 and 9.

In the column node 30 shown in FIG. 5, when an ignition key is inserted to an ignition key switch 66, a signal SI from the ignition key switch 66 is supplied to the input-output processor 63 (step S1). In the input-output processor 63, after the amplification and A/D conversion are performed on the signal SI (step S2), communication information DI is formed and supplied to both the control units 62 and 65 (step S3).

In the control unit 62, the operation processing based on the information DI and other information is performed, and operation processing output information DCI in accordance with the information DI is obtained and supplied to the transceiver 61. In the transceiver 61, coding and modulation are performed on the operation processing output information DCI (step S4), periodic control information DTC having the frame structure as shown in FIG. 7 is obtained based on the operation processing output information DCI and supplied to the periodic information communication line 11 (step S5).

In this case, a signal SS indicating that transmission of periodic control information DTC is detected in the transceiver 61 is supplied from the control unit 62 to the control unit 65 (step S6). In the control unit 65, when the signal SS indicates that the periodic control information DTC is properly transmitted to the periodic information communication line 11 from the transceiver 61 (the determination at step S7 is "YES"), a signal associated with the information DI will not be transmitted from the column node 30, even if the information DI is supplied from the input-output processor 63.

However, when the signal SS indicates that the periodic control information DTC is not properly transmitted to the periodic information communication line 11 because of a break of the communication line or data jam on the line (the determination at step S7 is "NO"), the operation processing based on the information DI and other information are performed in the control unit 65 (step S8), and operation processing output information DCI' corresponding to the information DI is obtained. The information DCI' is then supplied to the transceiver 64. In the transceiver 64, coding and modulation are performed on the information DCI' (step S9), and control information DTC' having the frame structure as shown in FIG. 7 is obtained in a form of non-periodic control information and supplied to the non-periodic information communication line 12 (S10).

Accordingly, if the periodic information communication line system is operating properly when the ignition key is inserted to the ignition key switch 66, the periodic control information DTC based on the signal SI from the ignition key switch 66 is outputted from the transceiver 61 to the periodic information communication line 11. On the other hand, if the periodic information communication line system is not operating properly and the information DTC is not properly sent from the transceiver 61 to the periodic information communication line 11, the control information DTC' based on the signal SI from the ignition key switch 66 is outputted in a form of non-periodic control information from the transceiver 64 to the non-periodic information communication line 12. Thus the periodic control information DTC which is to be transmitted through the periodic information communication line 11 is multiplexed to the non-periodic information communication line 12.

In the column node 30, a detected signal SSC is supplied to the input-output processor 63 from the sensor 67 (step S11). In the input-output processor 63, after amplification and A/D conversion are performed on the signal SSC (step S12), communication information DSS is formed and supplied to both the control units 62 and 65 (step S13). In the control unit 65, the operation processing based on the information DSS and other information is performed, and operation processing output information DCC corresponding the information DSS is obtained and supplied to the transceiver 64. In the transceiver 64, coding and modulation are performed on the information DCC (step S14), and non-periodic control information DTD having the frame structure as shown in FIG. 7 is obtained based on the information DCC and supplied to the non-periodic information communication line 12 (step S15).

In this case, a signal SE indicating of the transmission state of the non-periodic control information DTD in the transceiver 64 is supplied from the control unit 65 to the control unit 62 (step S16). In the control unit 62, when the signal SE indicates that the non-periodic control information DTD is properly transmitted to the non-periodic information communication line 12 from the transceiver 64 (the determination at step S17 is "YES"), a particular signal is not transmitted, even if the information DSS is supplied from the input-output processor 63.

However, when the signal SE indicates that the non-periodic control information DTD is not properly transmitted to the non-periodic information communication line 12 from the transceiver 64 because of, as described above, a break of the communication line or data jam on the line (the determination at step S17 is "NO"), the operation processing based on the information DSS and other information is performed in the control unit 62 (step S18), and operation processing information DCC' corresponding to the communication information DSS is obtained and supplied to the transceiver 61. In the transceiver 61, coding and modulation are performed on the information DÇC' (step S19), and control information DTD' having the frame structure as shown in FIG. 7 is obtained in a form of periodic control information and supplied to the periodic information communication line 11 (S20).

Accordingly, when the detected signal SSC from the sensor 67 is supplied to the input-output processor 63, under the condition that a non-periodic information communication line system is properly operating, the non-periodic control information DTD based on the signal SSC from the sensor 67 is supplied from the transceiver 64 to the non-periodic information communication line 12. On the other hand, if the non-periodic information communication line system is not properly operating and the non-periodic control information DTD is not properly transmitted to the non-periodic information communication line 12, the control information DTD' based on the detected signal SSC from the sensor 67 is transmitted to the periodic information communication line 11 from the transceiver 61 in a form of periodic control information. Thus non-periodic control information DTD which is to be transmitted through the non-periodic information communication line 12 in a multiplexed fashion is transmitted to the periodic information communication line 11.

Figure 10:
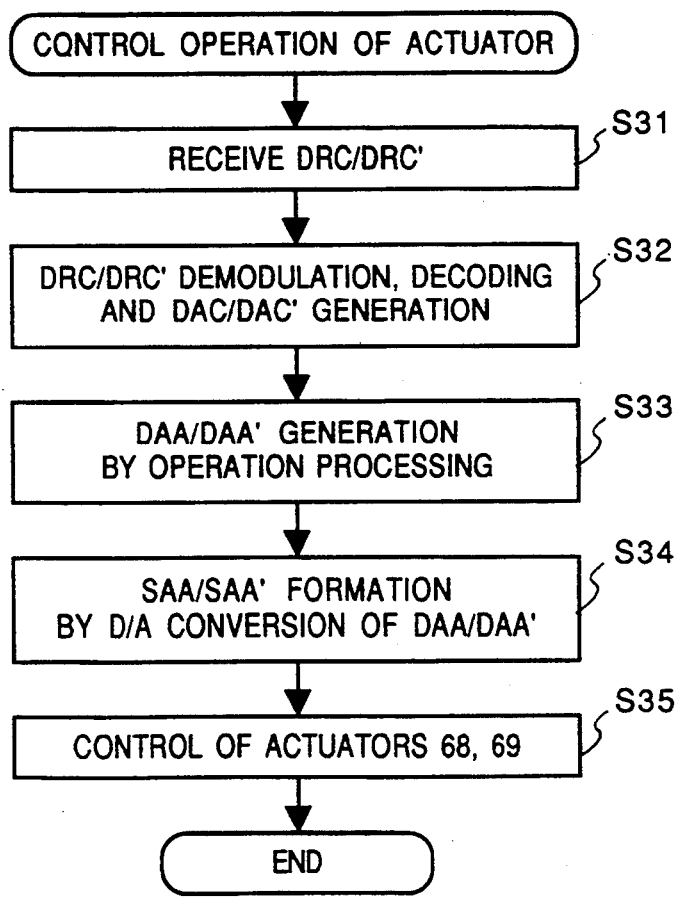
FIG. 10 is a flowchart illustrating the control operation of an actuator according to the preferred embodiment.

The control of an actuator is described with reference to the flowchart in FIG. 10.

In the column node 30, the transceiver 61 receives selected periodic control information DRC from the periodic information communication line 11 (step S31). The transceiver 61 performs demodulation and decoding on the periodic control information DRC to obtain reproduction information DAC which is supplied to the control unit 62 (step S32). In the control unit 62, the operation processing is performed based on the reproduction information DAC and other information to obtain operation processing information DAA which is supplied to the input-output processor 63 (step S33).

In the input-output processor 63, D/A conversion is performed on the information DAA to form a control signal SAA (step S34). The control signal SAA is supplied to the actuator 68 from the output processor 63 via an amplification circuit (not shown). Thus the operation control on the actuator 68 is performed by the control signal SAA (step S35).

Similarly, the transceiver 64 receives selected non-periodic control information DRC' from the non-periodic information line 12 (step S31). The transceiver 64 performs demodulation and decoding on the non-periodic control information DRC' to obtain reproduction information DAC' which is supplied to the control unit 65 (step S32). In the control unit 65, the operation processing is performed based on the reproduction information DAC' and other information to obtain operation processing information DAA' which is supplied to the input-output processor 63 (step S33).

In the input-output processor 63, D/A conversion is performed on information DAA' to form a control signal SAA' (step S34). The control signal SAA' is supplied to the actuator 69 from the input-output processor 63 via an amplification circuit (not shown). Thus the operation control on the actuator 69 is performed by the control signal SAA' (step S35).

The Operation of the Meter Node 31

The meter node 31 shown in FIG. 6 is regarded as an objective address of various periodic control information and non-periodic control information which are transmitted through the periodic information communication line 11 and non-periodic information communication line 12, and the meter node 31 receives these various periodic control information and non-periodic control information. In the meter node 31, the transceiver 71 receives periodic control information DRT from the periodic information communication line 11, and performs demodulation and decoding on the periodic control information DRT to obtain reproduction information DMM which is supplied to the control unit 72.

Figure 11:
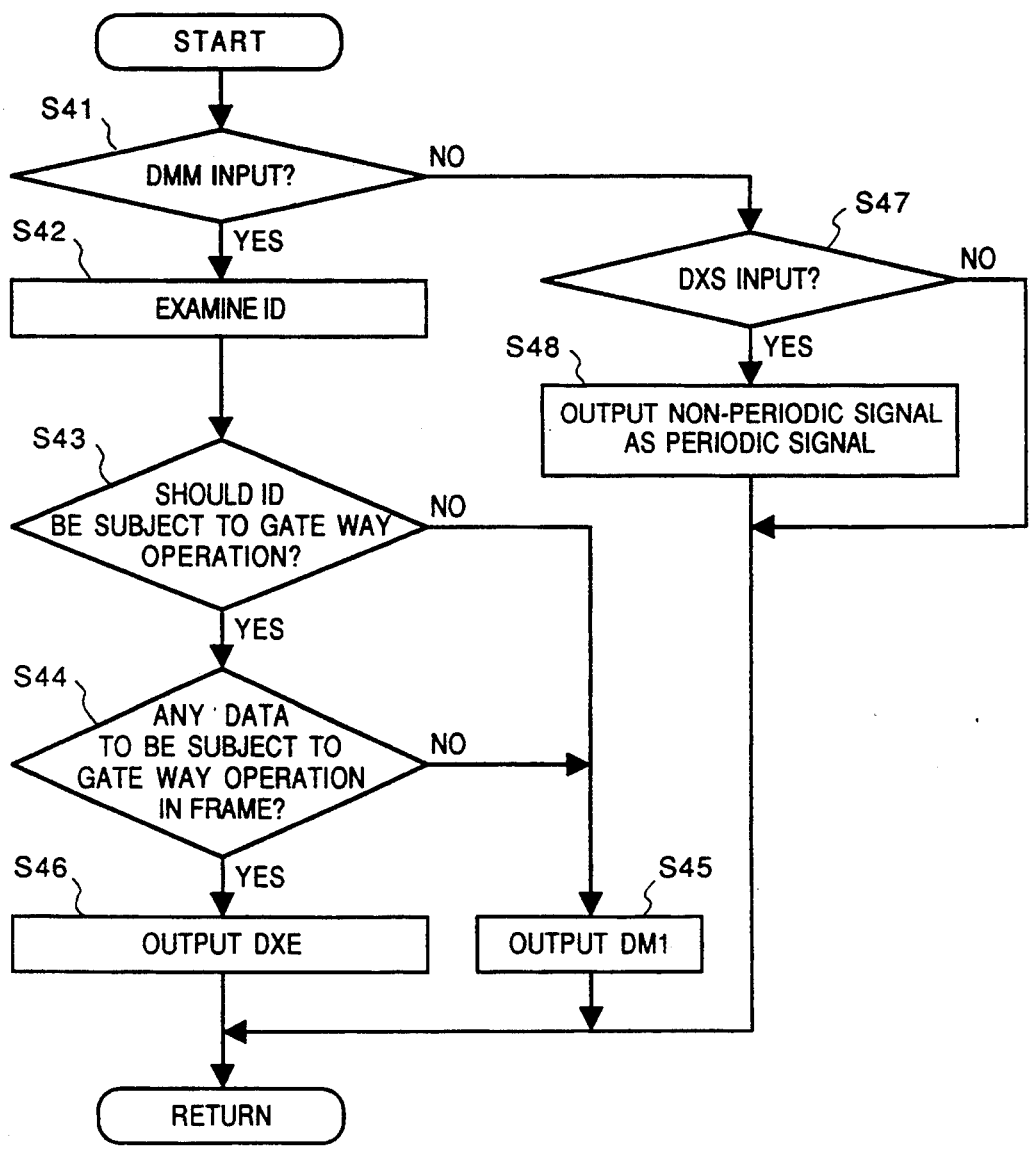
FIGS. 11 and 12 are flowcharts illustrating the control operation of the meter mode according to the preferred embodiment.

The operation of the control unit 72 is described with reference to the flowchart of FIG. 11.

When the control unit 72 receives the reproduction information DMM from the transceiver 71 (the determination at step S41 is "YES"), data ID is examined based on the reproduction information DMM (step S42). If the data ID indicates to execute a gate way operation (the determination at step S43 is "YES") and the periodic control information DRT received from the periodic information communication line 11 contains data which is subject to the gate way operation (the determination at step S44 is "YES"), transfer information DXE is transmitted to the control unit 75 to the effect that the information DRT which should be transmitted through the non-periodic information communication line 12 (step S46).

On the other hand, in the control unit 72, when the determination at step S43 or S44 is "NO", the operation processing is performed based on the reproduction information DMM and other information to obtain information DM1. The information DM1 is then supplied to output processor 73 (step S45). In the output processor 73, D/A conversion is performed on the information DM1 to form a control signal SM1. The control signal SM1 is supplied to the meter unit 77 from the output processor 73 via an amplification circuit (not shown). Thus the meter unit 77 performs the instruction operation in accordance with the content of the periodic control information DRT received from the periodic information communication line 11.

Note that if the information DRT is not the control information which should be transmitted through the non-periodic information communication line 12, the transfer information DXE is not transmitted from the control unit 72 to the control unit 75.

In the meter node 31, the transceiver 74 receives non-periodic control information DRT' from the non-periodic information line 12. The transceiver 74 performs demodulation and decoding on the non-periodic control information DRT' to obtain reproduction information DMM' which is supplied to the control unit 75.

Figure 12:
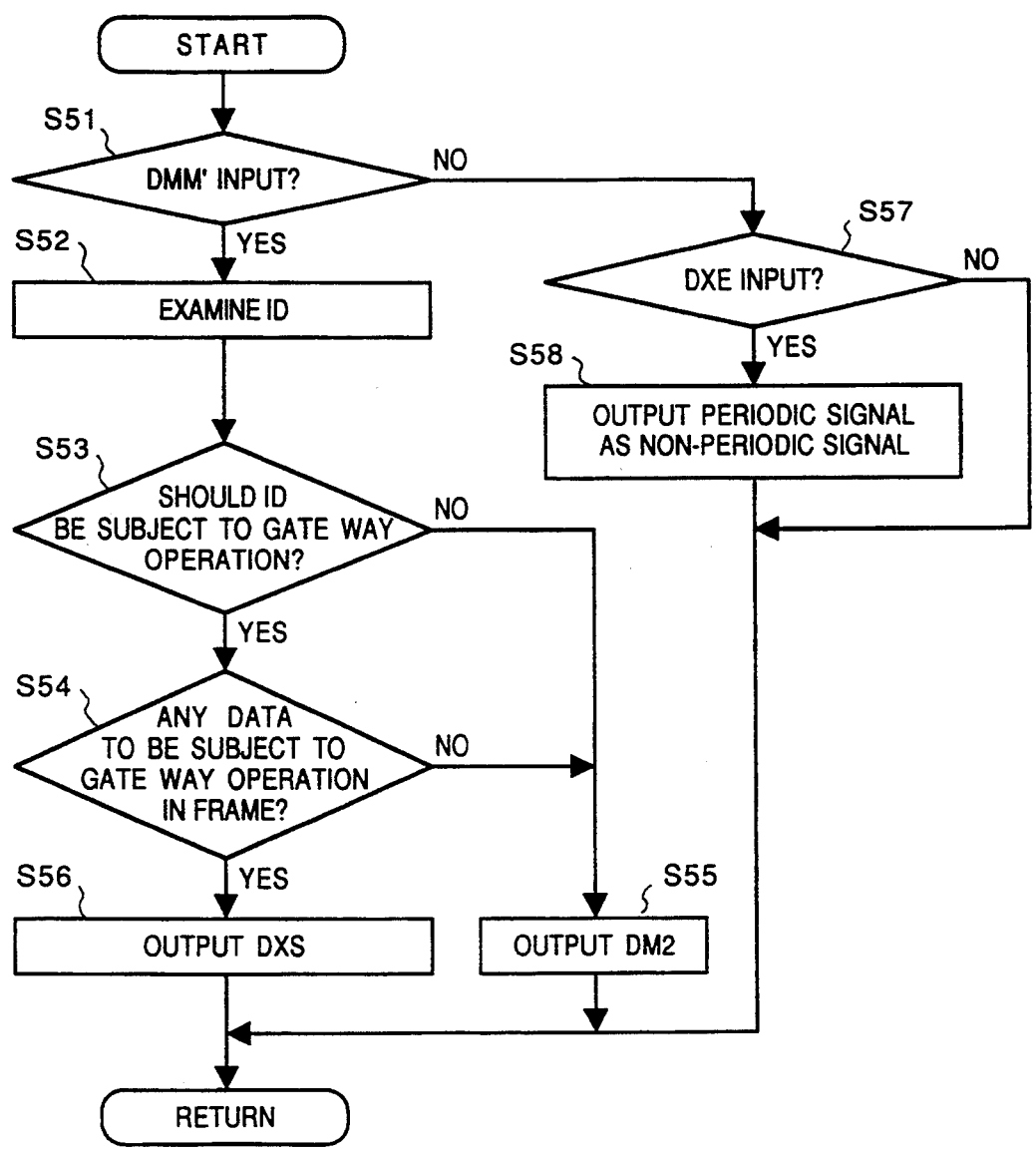
Figure 13:
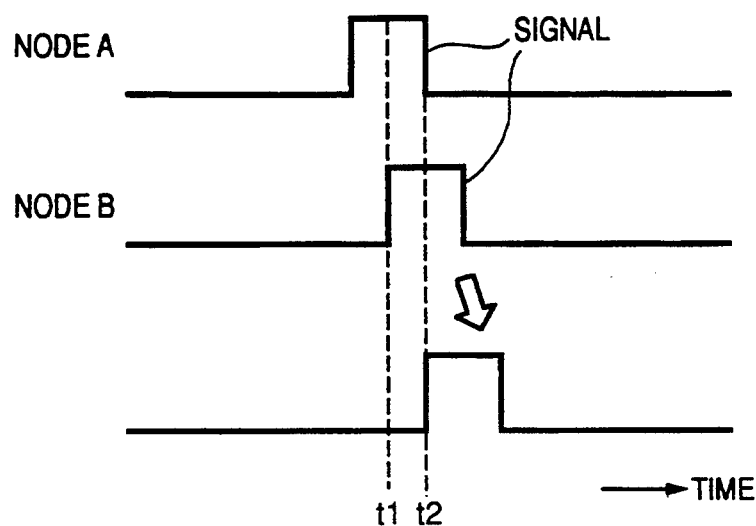
FIGS. 13 and 14 are timing charts demonstrating a transmission operation of conventional node.
Figure 14:
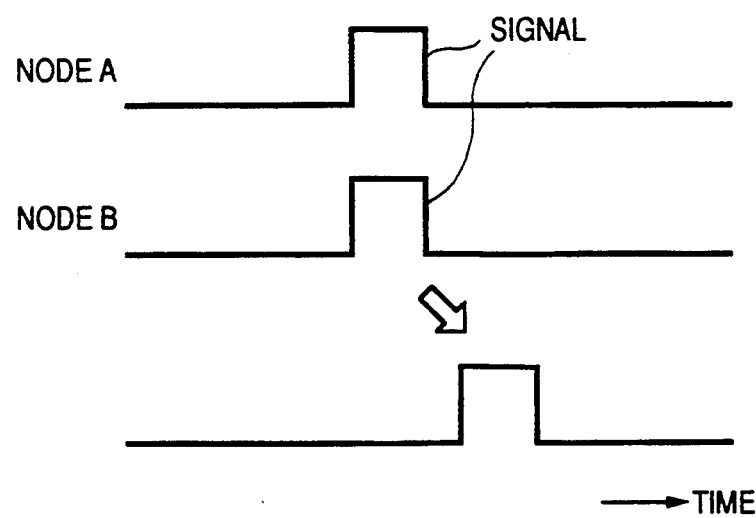

The operation of the control unit 75 is described with reference to the flowchart of FIG. 12. The control unit 75 receives non-periodic control information DRT' from the non-periodic information communication line 12, and if the reproduction information DMM' is obtained based on the information DRT' (the determination at step S51 is "YES"), data ID included in the information DRT' is examined (step S52). If the data ID indicates to execute the gate way operation (the determination at step S53 is "YES") and the DRT' contains data which is subject to the gate way processing, the transfer information DXS is transmitted to the control unit 72 to the effect that the information DRT' should be transmitted through the periodic information communication line 11 (step S56). Furthermore, in the control unit 72 to which the transfer information DXS is supplied, operation processing output information DCT is formed based on the transfer information DXS and other information and supplied to the transceiver 71 (steps S47 and S48 of FIG. 11).

In the transceiver 71, coding and modulation are performed on the operation processing output information DCT to obtain periodic control information DTT corresponding to the information DCT. The obtained information DTT is then supplied to the periodic information communication line 11. Accordingly, the periodic control information DTT whose content is the same as that of the non-periodic control information DRT' received from the non-periodic information communication line 12 is transmitted through the periodic information communication line 11.

On the other hand, if the determination at step S53 or S54 is "NO", the control unit 75 performs the operation processing based on the reproduction information DMM' and other information to obtain information DM2. The obtained DM2 is then supplied to the output processor 76 (step S55). The output processor 76 performs D/A conversion on the information DM2 to form a control signal SM2. The control signal SM2 is supplied to the meter unit 77 from the output processor 76 via an amplification circuit (not shown). Thus the operation control for the meter unit 77 is performed by the control signal SM2.

The control unit 75 to which the transfer information DXE is supplied performs the operation processing based on the transfer information DXE and other information to obtain operation processing output information DCT', corresponding to the periodic control information DRT, and supplies the information DCT' to the transceiver 74. In the transceiver 74, coding and modulation are performed on the information DCT' to obtain non-periodic control information DTT' based on the information DCT'. The obtained information DTT' is outputted to the non-periodic information communication line 12 (steps S57 and S58).

Furthermore, if the non-periodic control information DRT' received from the non-periodic information communication line 12 is not the control information which should be transmitted originally through the periodic information communication line 11, the transfer information DXS will not be transmitted from the control unit 75 to the control unit 72.

By the operation of the meter node 31 as mentioned above, the control information which should be transmitted through the periodic information communication line 11 is transmitted through the periodic information communication line 11 or through both the periodic information communication line 11 and the non-periodic information communication line 12. On the other hand, the control information which should be transmitted through the non-periodic information communication line 12 is transmitted through the non-periodic information communication line 12 or through both the non-periodic information communication line 12 and the periodic information communication line 11.

According to the present invention, a first communication line where plural types of periodic control information are multiplexed is provided separately from a second communication line where plural types of non-periodic control information are multiplexed. A node connected to the first communication line transmits periodic control information to the first communication line on which the information is multiplexed. The node connected to the first communication line also receives the periodic control information and uses the information to form a control signal with respect to an operation unit connected to the node.

A node connected to the second communication line transmits non-periodic control information to the second communication line on which the information is multiplexed. The node connected to the second communication line also receives non-periodic control information and uses the information to form a control signal with respect to an operation unit connected to the node.

Therefore, the periodic control information and the non-periodic control information which are respectively transmitted through the first communication line and the second communication line do not interfere each other. Accordingly, it is prevented that the intervals at which the periodic control information is transmitted are changed undesirably when the periodic control information is influenced by the non-periodic control information.

As many apparently widely different embodiments of the present invention can be made without departing from the spirit and scope thereof, it is to be understood that the invention is not limited to the specific embodiments thereof except as defined in the appended claims.

What is claimed is:

1. A multiplex transmission apparatus having a plurality of multiplex transmission paths and a plurality of communication nodes connected to the plurality of multiplex transmission paths, each communication node generating at least one of periodic control information and non-periodic control information, comprising:
   a first multiplex transmission path for performing multiplex transmission of the periodic control information;
   a second multiplex transmission path for performing multiplex transmission of the non-periodic control information;
   first transmission/reception means for transmitting/receiving the periodic control information to/from said first multiplex transmission path;
   second transmission/reception means for transmitting/receiving the non-periodic control information to/from said second multiplex transmission path;
   first determination means for determining whether or not the periodic control information which has been sent from said first multiplex transmission path is a kind of information originally sent from said second multiplex transmission path;
   second determination means for determining whether or not the non-periodic control information which has been sent from said second multiplex transmission path is a kind of information originally sent from said first multiplex transmission path;
   first changing means for changing an object transmission path so that the periodic control information from said first multiplex transmission path is transferred to said second multiplex transmission path when it is determined that the periodic control information is originally sent from said second multiplex transmission path; and
   second changing means for changing an object transmission path so that the non-periodic control information from said second multiplex transmission path is transferred to said first multiplex transmission path when it is determined that the non-periodic control information is originally sent from said first multiplex transmission path.

2. The apparatus according to claim 1, wherein said first changing means further comprises:
   converting means for converting the periodic control information into a form of non-periodic control information when said first determination means determines that the periodic control information is originally sent from said second multiplex transmission path; and
   means for transmitting the non-periodic control information converted by said converting means to said second transmission/reception means.

3. The apparatus according to claim 1, wherein said second changing means further comprises:
   converting means for converting the non-periodic control information into a form of periodic control information when said second determination means determines that the non-periodic control information is originally sent from said first multiplex transmission path; and
   means for transmitting the periodic control information converted by said converting means to said first transmission/reception means.

4. The apparatus according to claim 1, wherein said first changing means further comprises:
   generating means for generating non-periodic control information having the same information as the received periodic control information when said first determination means determines that said received periodic control information is originally sent from said second multiplex transmission path; and
   means for transmitting the non-periodic control information generated by said generation means to said second transmission/reception means.

5. The apparatus according to claim 1, wherein said second changing means further comprises:
   generating means for generating periodic control information having the same information as the received non-periodic control information when said second determination means determines that said received non-periodic control information is originally sent from said first multiplex transmission path; and
   means for transmitting the periodic control information generated by said generation means to said first transmission/reception means.

6. The apparatus according to claim 1, wherein said plurality of communication nodes include a communication node having only said first transmission/reception means, a communication node having only said second transmission/reception means, and a communication node having both said first transmission/reception means and said second transmission/reception means so as to transmit/receive said periodic and nonperiodic control information.

7. The apparatus according to claim 1, wherein said plurality of communication nodes are connected to sensors and switches acting as signal generators, and actuators and motors acting as operation units.

* * * * *